(12) United States Patent
Kinugasa et al.

(10) Patent No.: US 12,333,013 B2
(45) Date of Patent: Jun. 17, 2025

(54) ELECTRONIC CONTROL DEVICE AND UPDATING METHOD FOR CONTROL SOFTWARE

(71) Applicant: Hitachi Astemo, Ltd., Hitachinaka (JP)

(72) Inventors: Shun Kinugasa, Hitachinaka (JP); Kenji Ando, Hitachinaka (JP); Yusuke Abe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 220 days.

(21) Appl. No.: 18/010,297

(22) PCT Filed: Feb. 5, 2021

(86) PCT No.: PCT/JP2021/004264
§ 371 (c)(1),
(2) Date: Dec. 14, 2022

(87) PCT Pub. No.: WO2021/255984
PCT Pub. Date: Dec. 23, 2021

(65) Prior Publication Data
US 2023/0252153 A1    Aug. 10, 2023

(30) Foreign Application Priority Data

Jun. 17, 2020    (JP) .................. 2020-104293

(51) Int. Cl.
*G06F 21/57*    (2013.01)
*G06F 3/06*    (2006.01)
*G06F 8/654*    (2018.01)

(52) U.S. Cl.
CPC .......... *G06F 21/572* (2013.01); *G06F 3/0607* (2013.01); *G06F 3/061* (2013.01);
(Continued)

(58) Field of Classification Search
CPC ...... G06F 3/0665; G06F 3/061; G06F 3/0652; G06F 3/0607
See application file for complete search history.

(56) References Cited

U.S. PATENT DOCUMENTS 5,835,939 A * 11/1998 Kurokawa ............ G06F 3/0607
711/112
2003/0120912 A1    6/2003 Sasaki et al.
(Continued)

FOREIGN PATENT DOCUMENTS

JP    2003-196097 A    7/2003
JP    2007-257473 A    10/2007
(Continued)

OTHER PUBLICATIONS

English Translation of the International Search Report issued in corresponding International Application No. PCT/JP2021/004264, dated May 25, 2021.

*Primary Examiner* — Barbara B Anyan
(74) *Attorney, Agent, or Firm* — Foley & Lardner LLP

(57) ABSTRACT

Provided is a technique for enabling software having different memory maps to be written in a nonvolatile memory of an electronic control device in reprogramming of control software.
The electronic control device includes a microcomputer including a CPU and a nonvolatile memory. The nonvolatile memory includes activation software, control software, and validity confirmation information for confirming validity of the control software. A storage area of the validity confirmation information in the nonvolatile memory is different from a storage area of the activation software.

9 Claims, 16 Drawing Sheets

(52) U.S. Cl.
CPC .......... *G06F 3/0652* (2013.01); *G06F 3/0665* (2013.01); *G06F 8/654* (2018.02); *G06F 2221/033* (2013.01)

(56) References Cited

U.S. PATENT DOCUMENTS

| | | | | |
|---|---|---|---|---|
| 2005/0219899 | A1* | 10/2005 | Kishi | G06F 3/0652 |
| | | | | 365/185.11 |
| 2007/0250254 | A1 | 10/2007 | Kimoto | |
| 2016/0364142 | A1* | 12/2016 | Kanno | G06F 3/061 |
| 2017/0228162 | A1* | 8/2017 | Tan | G06F 3/0665 |
| 2017/0262228 | A1* | 9/2017 | Kanno | G11C 16/10 |
| 2020/0218549 | A1 | 7/2020 | Ito | |

FOREIGN PATENT DOCUMENTS

| | | |
|---|---|---|
| JP | 2014-179047 A | 9/2014 |
| JP | 2016-167113 A | 9/2016 |
| JP | 2017-199120 A | 11/2017 |
| JP | 2019-061520 A | 4/2019 |
| JP | 2019-109745 A | 7/2019 |

\* cited by examiner

FIG. 13

| | 20 | |
|---|---|---|
| | 201 | 201' |
| | NUMBER OF DIVISION UNITS | INVERTED VALUE OF NUMBER OF DIVISION UNITS |
| 211 | START POINT ADDRESS OF DIVISION UNIT 11 | INVERTED VALUE OF START POINT ADDRESS OF DIVISION UNIT 11 | 211' |
| 311 | END POINT ADDRESS OF DIVISION UNIT 11 | INVERTED VALUE OF END POINT ADDRESS OF DIVISION UNIT 11 | 311' |
| 511 | START POINT ADDRESS OF VALIDATION VALUE OF DIVISION UNIT 11 | INVERTED VALUE OF START POINT ADDRESS OF VALIDATION VALUE OF DIVISION UNIT 11 | 511' |
| 611 | END POINT ADDRESS OF VALIDATION VALUE OF DIVISION UNIT 11 | INVERTED VALUE OF END POINT ADDRESS OF VALIDATION VALUE OF DIVISION UNIT 11 | 611' |
| ⋮ | | |
| 21N | START POINT ADDRESS OF DIVISION UNIT 1N | INVERTED VALUE OF START POINT ADDRESS OF DIVISION UNIT 1N | 21N' |
| 31N | END POINT ADDRESS OF DIVISION UNIT 1N | INVERTED VALUE OF END POINT ADDRESS OF DIVISION UNIT 1N | 31N' |
| 51N | START POINT ADDRESS OF VALIDATION VALUE OF DIVISION UNIT 1N | INVERTED VALUE OF START POINT ADDRESS OF VALIDATION VALUE OF DIVISION UNIT 1N | 51N' |
| 61N | END POINT ADDRESS OF VALIDATION VALUE OF DIVISION UNIT 1N | INVERTED VALUE OF END POINT ADDRESS OF VALIDATION VALUE OF DIVISION UNIT 1N | 61N' |

| 201 — NUMBER OF DIVISION UNITS | 201' — INVERTED VALUE OF NUMBER OF DIVISION UNITS |
|---|---|
| 211 — START POINT ADDRESS OF DIVISION UNIT 11 | 211' — INVERTED VALUE OF START POINT ADDRESS OF DIVISION UNIT 11 |
| 311 — END POINT ADDRESS OF DIVISION UNIT 11 | 311' — INVERTED VALUE OF END POINT ADDRESS OF DIVISION UNIT 11 |
| 511 — START POINT ADDRESS OF VALIDATION VALUE OF DIVISION UNIT 11 | 511' — INVERTED VALUE OF START POINT ADDRESS OF VALIDATION VALUE OF DIVISION UNIT 11 |
| 611 — END POINT ADDRESS OF VALIDATION VALUE OF DIVISION UNIT 11 | 611' — INVERTED VALUE OF END POINT ADDRESS OF VALIDATION VALUE OF DIVISION UNIT 11 |
| ⋮ | ⋮ |
| 21N — START POINT ADDRESS OF DIVISION UNIT 1N | 21N' — INVERTED VALUE OF START POINT ADDRESS OF DIVISION UNIT 1N |
| 31N — END POINT ADDRESS OF DIVISION UNIT 1N | 31N' — INVERTED VALUE OF END POINT ADDRESS OF DIVISION UNIT 1N |
| 51N — START POINT ADDRESS OF VALIDATION VALUE OF DIVISION UNIT 1N | 51N' — INVERTED VALUE OF START POINT ADDRESS OF VALIDATION VALUE OF DIVISION UNIT 1N |
| 61N — END POINT ADDRESS OF VALIDATION VALUE OF DIVISION UNIT 1N | 61N' — INVERTED VALUE OF END POINT ADDRESS OF VALIDATION VALUE OF DIVISION UNIT 1N |
| 700 — VALIDATION VALUE OF ADDRESS HEADER 20 (FOR EXAMPLE, CHECKSUM, CRC, HASH VALUE) ||

ELECTRONIC CONTROL DEVICE AND UPDATING METHOD FOR CONTROL SOFTWARE

TECHNICAL FIELD

The present invention relates to an electronic control device, and particularly relates to a technique for updating control software in an in-vehicle electronic control device mounted on an automobile.

BACKGROUND ART

In an electrical control unit (ECU) mounted on an automobile, a control program (control software) and control data are written in a nonvolatile memory such as a flash read only memory (ROM) built in a microcomputer. The control program and the control data written in the flash ROM may be rewritten and updated.

As a proposal of a technique for rewriting a control program in an electronic control device, there are JP 2019-109745 A, JP 2017-199120 A, JP 2016-167113 A, and the like.

CITATION LIST

Patent Literature

PTL 1: JP 2019-109745 A
PTL 2: JP 2017-199120 A
PTL 3: JP 2016-167113 A

SUMMARY OF INVENTION

Technical Problem

The technique described below is not a publicly known technique but a technique studied by the present inventors before the present invention.

The present inventors stored activation software (boot loader) and control software in a flash ROM, and assigned the following functions to the boot loader.

The functions include a function (1) of initializing a register, a random access memory (RAM), peripheral devices, and the like built in a microcomputer, a function (2) of rewriting (updating or reprogramming) control software, and a function (3) of confirming validity of control software, where the control software can be divided into a plurality of areas (division units) according to a role thereof and data held therein.

When validity confirmation is performed for the control software or each division unit of the control software, validity confirmation information for confirming validity, such as an address range to be calculated, such as a sum value, a CRC value, or a hash value, that is, a start point address and an end point address of each division unit, and a storage address of an expected value, is required, and the validity confirmation information is stored as a fixed value in the boot loader.

Therefore, when the reprogramming of the control software involves a change in the memory map, that is, a change in the division mode of the control software, the boot loader also needs to be rewritten at the same time. However, when the boot loader is responsible for the reprogramming function, the boot loader cannot rewrite itself.

An object of the present disclosure is to provide a technique for enabling software having different memory maps to be written in a nonvolatile memory of an electronic control device in reprogramming of control software.

Other objects and novel features will become apparent from the description of the present specification and the accompanying drawings.

Solution to Problem

An outline of representative ones of the present disclosure will be briefly described below.

An electronic control device according to an embodiment includes a microcomputer including a CPU and a nonvolatile memory. The nonvolatile memory includes activation software, control software, and validity confirmation information for confirming validity of the control software. A storage area of the validity confirmation information in the nonvolatile memory is different from a storage area of the activation software.

Advantageous Effects of Invention

According to the electronic control device of the embodiment, since the control software and the validity confirmation information can be rewritten in the update (reprogramming) of the control software, software having different memory maps can be written in the nonvolatile memory.

BRIEF DESCRIPTION OF DRAWINGS

FIG. 13 is a diagram illustrating a configuration example of an address header in FIG. 12.

FIG. 15 is a diagram illustrating another configuration example of the address header in FIG. 12.

DESCRIPTION OF EMBODIMENTS

Figure 1:
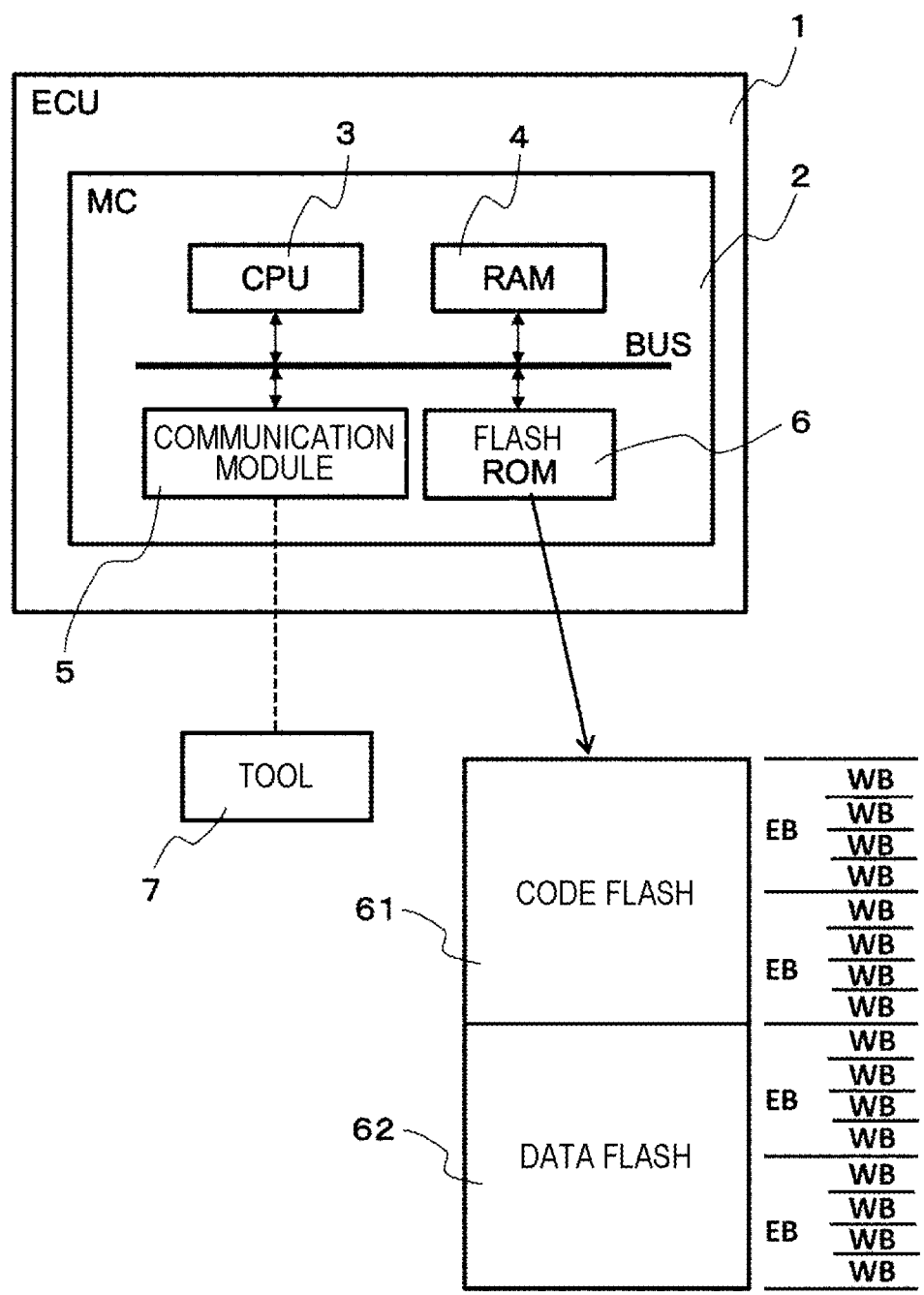
FIG. 1 is a diagram illustrating a configuration example of an electronic control device according to an embodiment.

Hereinafter, embodiments and examples will be described with reference to the drawings. However, in the following description, the same components are denoted by the same reference numerals, and the redundant description may be omitted. Note that, in order to make the description clearer, the drawings may be schematically illustrated as compared with the actual embodiment, but they are merely examples and do not limit the interpretation of the present invention.

Embodiment

Overall Configuration of Electronic Control Device

FIG. 1 is a diagram illustrating a configuration example of an electronic control device according to an embodiment. An in-vehicle electrical control unit (ECU) 1 mounted on an automobile includes a microcomputer (MC) 2. The microcomputer 2 includes at least one central processor unit (CPU) 3 that performs arithmetic processing based on software, at least one volatile random access memory (RAM) 4, at least one flash ROM 6 that holds programs and data, at least one communication module 5 for communicating with the outside, a bus BUS that interconnects respective circuits (3, 4, 5, 6), and the like. When the ECU 1 is powered on, the microcomputer 2 is activated and the software written in the flash ROM 6 is executed by the CPU 3. The microcomputer 2 includes a plurality of external terminals to which various functions are assigned, and corresponding external devices are provided in the plurality of external terminals. A target external device is controlled by control software stored in the flash ROM 6 which is a nonvolatile memory. In an automobile, the in-vehicle electronic control device 1 controls, for example, fuel injection and ignition of an engine.

The volatile RAM 4 is a volatile memory, and temporarily stores data in the middle of arithmetic processing by the CPU 3. In one example, the volatile RAM 4 can be a static random access memory (SRAM).

The flash ROM 6 is an electrically erasable and writable nonvolatile memory. In FIG. 1, a nonvolatile memory is described as the flash ROM 6, but the flash ROM 6 may be an electrically erasable programmable read-only memory (EEPROM). The address space of the flash ROM 6 includes a first storage area 61 in which software is mainly stored and a second storage area 62 in which data is mainly stored. In the following description, the first storage area 61 will be described as a code flash 61, and the second storage area 62 will be described as a data flash 62. As illustrated in FIG. 1, each of the code flash 61 and the data flash 62 has a plurality of erase blocks EB, and each of the code flash 61 and the data flash 62 has a plurality of write blocks WB. Each of the erase blocks EB indicates a data erase unit, and the write block WB indicates a data write unit. One erase block EB includes a plurality of write blocks WB. That is, the flash ROM 6 can erase data in units of erase blocks EB of a certain size, and can write data in units of write blocks WB of a size smaller than the erase blocks EB. FIG. 1 exemplarily illustrates a configuration example in which each of the code flash 61 and the data flash 62 includes two erase blocks EB and each erase block EB includes four write blocks WB, but the present invention is not limited thereto, and the number of blocks of the erase blocks EB and the number of blocks of the write blocks WB can be changed.

The communication module 5 is a communication unit, and can connect a diagnosis tool 7 at the time of software rewriting of the electronic control device 1, for example.

First Configuration Example of Software Stored in Flash ROM

Figure 2:
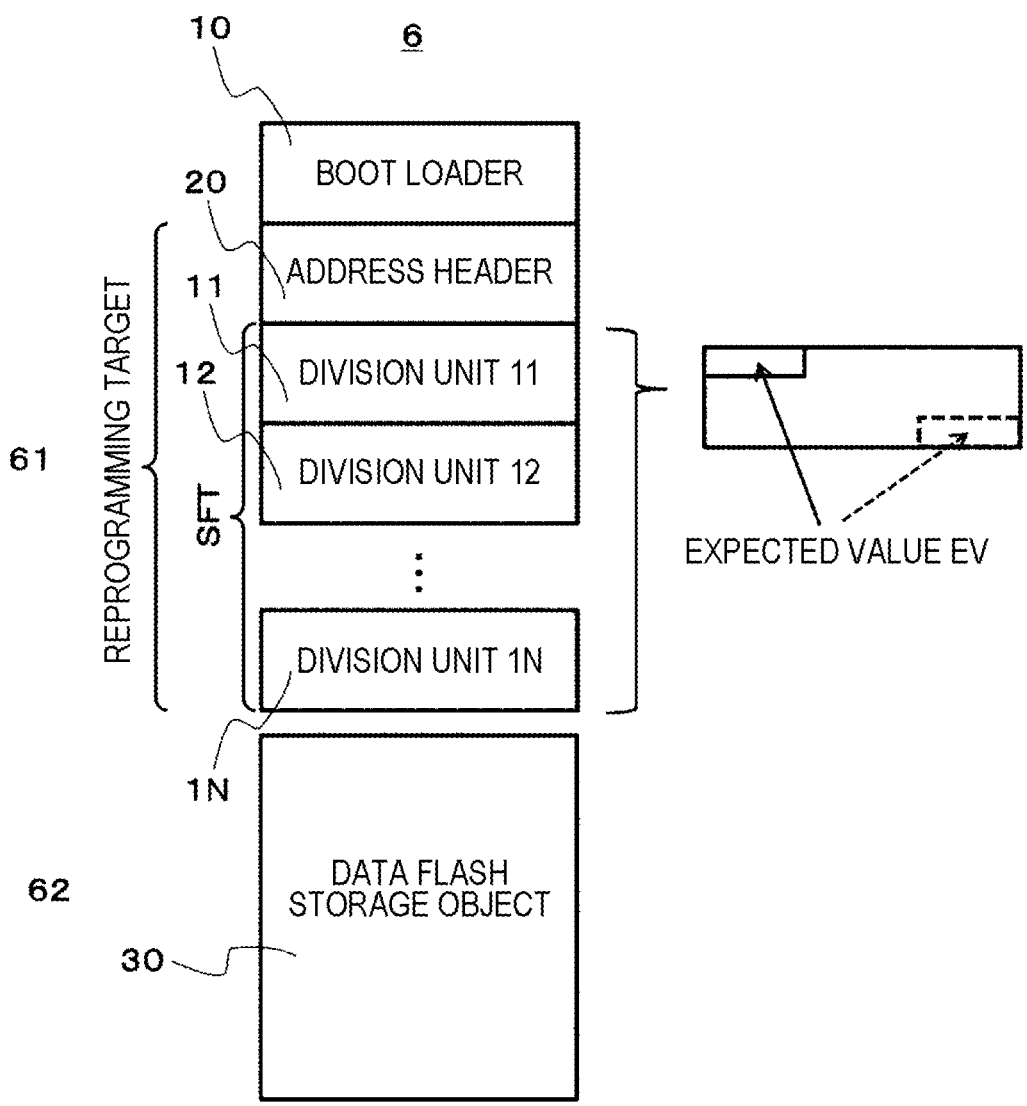
FIG. 2 is a diagram illustrating a first configuration example of software stored in the flash ROM of FIG. 1.

FIG. 2 is a diagram illustrating a first configuration example of software stored in the flash ROM of FIG. 1. As illustrated in FIG. 2, activation software (hereinafter, it is referred to as a boot loader) 10, an address header 20, and control software SFT are stored in the code flash 61 of the flash ROM 6. The data flash 62 of the flash ROM 6 stores a data flash storage object 30 constituting control data, a control table, and the like. The data flash storage object 30 is referred to by the CPU 3 that executes the control software SFT, and the electronic control device 1 executes desired control.

The boot loader 10 has a function of initializing a register, the RAM 4, peripheral devices (not illustrated), and the like built in the microcomputer 2, a function of rewriting (updating or reprogramming) the control software SFT, and a function of confirming validity of the control software SFT.

The control software SFT can be logically divided into a plurality of areas according to roles and data to be held. The control software SFT may be integral. In FIG. 2, the plurality of areas are illustrated as a division unit 11, a division unit 12, . . . , and a division unit 1N.

The address header 20 is stored in a storage area different from the storage area of the boot loader 10 in the flash ROM 6. The address header 20 includes validity confirmation information (also referred to as validity verification information) for confirming validity of the control software SFT. The validity confirmation information can also be referred to as division information. As the validity confirmation information, for example, the number of division units of the control software SFT, a start point address and an end point address or size information for each division unit, a start point address and an end point address of an area in which a validation value (expected value EV) for each division unit is embedded, and the like are held. A detailed configuration example of the address header 20 can be referred to FIGS. 5 to 9 described later. As illustrated in FIG. 2, the validation value for each of the division units 11 to 1N is preferably stored in, for example, an area near the start point address of the storage area of each of the division units 11 to 1N or an area near the end point address of the storage area of each of the division units. In the present specification, a value for verifying the validity of the control software SFT is referred to as a validation value. When a sum value, a cyclic redundancy check (CRC) value, a hash value, or the like is obtained by calculation, the validation value can also be referred to as an expected value EV for a calculation result thereof.

The boot loader 10 is a program that is activated immediately after activation of the microcomputer 2, and performs initialization of a register, the RAM 4, peripheral devices (not illustrated), and the like built in the microcomputer 2, and then confirms validity of the control software SFT. This validity confirmation is performed for each of the division units 11 to 1N of the control software SFT based on the validity confirmation information stored in the address header 20, and for each of the division units 11 to 1N, for example, a sum value, a cyclic redundancy check (CRC) value, a hash value, or the like is calculated and compared with a value (expected value EV) embedded in the flash ROM 6 in advance or a known value.

In addition, the boot loader 10 has a function of rewriting (reprogramming) the control software SFT, and for example, in the ECU 1, the software rewriting function is enabled in response to a software rewriting request transmitted from the externally connected diagnosis tool 7. Subsequently, according to a request transmitted from the diagnosis tool 7, both the control software SFT and the address header 20 written in the flash ROM 6 are erased, and the transmitted new control software (SFT) and new address header (20) are written in the flash ROM 6. That is, the division units 11 to 1N and the address header 20 constituting the control software SFT are reprogramming targets. A series of operations of erasing and writing is performed for each of the division units 11 to 1N of the control software SFT. In addition, the boot loader 10 also confirms the validity of the new control software (SFT) received from the diagnosis tool 7. This validity confirmation is also performed using a hash value, a digital signature, a sum value, CRC, or the like.

Second Configuration Example of Software Stored in Flash ROM

Figure 3:
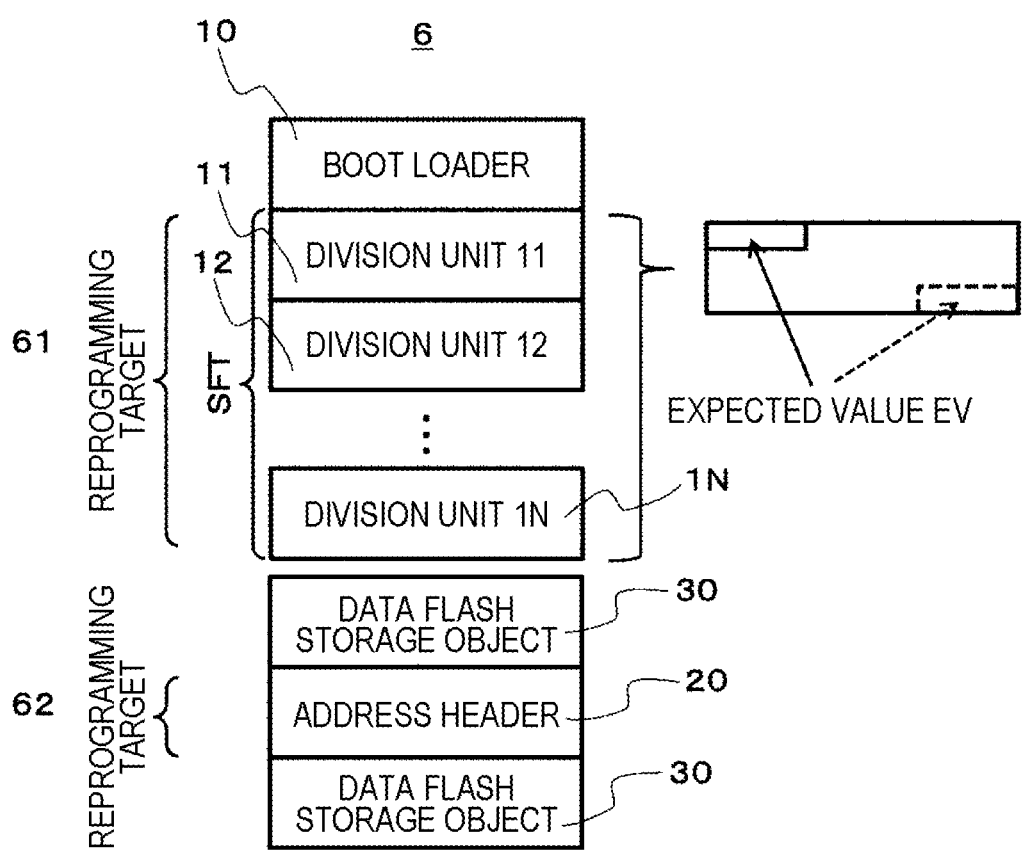
FIG. 3 is a diagram illustrating a second configuration example of software stored in the flash ROM of FIG. 1.

FIG. 3 is a diagram illustrating a second configuration example of the software stored in the flash ROM of FIG. 1. FIG. 3 is different from FIG. 2 in that, in FIG. 3, the address header 20 is stored or written in the data flash 62 of the flash ROM 6 together with the data flash storage object 30 constituting control data or the like. That is, the boot loader 10 is stored in a desired storage area of the code flash 61 of the flash ROM 6, and the address header 20 is stored in a desired storage area of the data flash 62 of the flash ROM 6 different from the storage area of the boot loader 10. Since the other configuration of FIG. 3 is the same as the other configuration of FIG. 2, the redundant description will be omitted. Note that a detailed configuration example of the address header 20 can be referred to FIGS. 13 and 15 described later.

In the embodiment, in the validity confirmation of the control software 6 at the time of software rewriting and software activation of the in-vehicle electronic control device 1, the number of the division units 11 to 1N of the control software SFT and the address header 20 which is the division information are held in a storage area different from the boot loader 10, and the boot loader 10 refers to the storage area of the address header 20 in the validity confirmation of the division units 11 to 1N.

According to the embodiment, the address header 20 is paired with the control software SFT, and the address header 20 is also rewritten simultaneously with the control software SFT at the time of reprogramming the control software SFT. The boot loader 10 does not need to rewrite. As a result, even if the memory map in the code flash 61 of the flash ROM 6 of the division units 11 to 1N of the control software SFT is different before and after reprogramming, the validity of the control software SFT can be confirmed by the same boot loader 10.

Comparative Example

Figure 4:
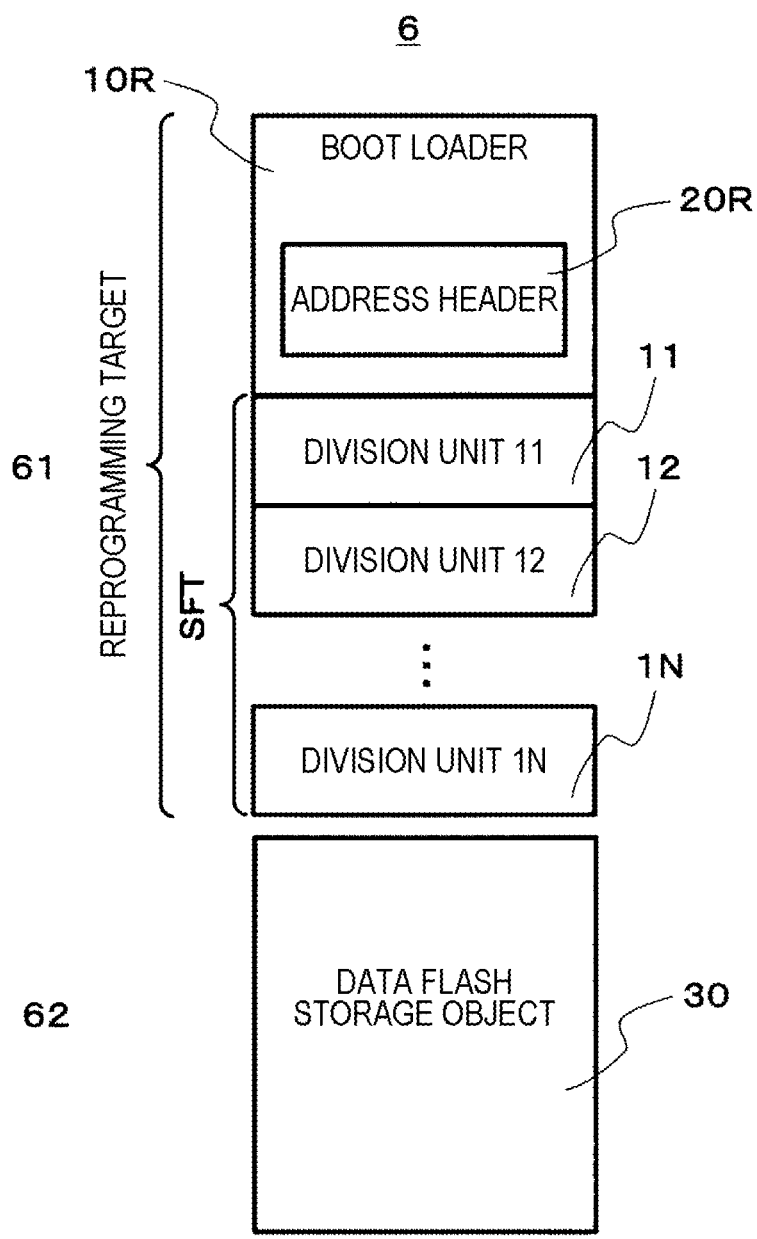
FIG. 4 is a diagram illustrating a configuration example of software stored in a flash ROM according to a comparative example.

FIG. 4 is a diagram illustrating a configuration example of software stored in a flash ROM according to a comparative example. In FIG. 4, a boot loader 10R is stored in the code flash 61 of the flash ROM 6, and the address header 20R is stored in an internal area of the boot loader 10R.

As illustrated in FIG. 4, when validity confirmation is performed for the division units (11 to 1N) of the control software SFT or the control software SFT, validity confirmation information such as an address range in which a sum value, a CRC value, a hash value, or the like is calculated, that is, a start point address or an end point of the division unit and a storage address of an expected value is required, and the validity confirmation information is stored in the boot loader as the address header 20R.

Therefore, when reprogramming of the control software SFT involves a change in the memory map, that is, involves a change in the division mode of the control software SFT, it is necessary to rewrite the boot loader 10R and the address header 20R at the same time. However, when the boot loader 10R is responsible for the reprogramming function, the boot loader 10R cannot rewrite the boot loader 10R itself.

From the above discussion, the reprogramming function of the boot loader 10R cannot be used to rewrite the boot loader 10R. As reprogramming means that does not depend on the boot loader 10R, there is a method of using a debug port (not illustrated) of the microcomputer 2 or deploying reprogramming software on the RAM 4 to perform reprogramming of the control software SFT.

However, when the electronic control device 1 is sealed or the debug port is invalidated, it is difficult to perform reprogramming. In addition, since it is necessary to incorporate a mechanism for receiving reprogramming software to be deployed on the RAM 4 in advance via the communication module 5 into the boot loader 10R, and it is also necessary to prepare reprogramming software itself to be deployed on the RAM 4, it is difficult to implement without planned preparation. In addition, even when reprogramming is performed, it takes an extra time to transfer reprogramming software to the RAM 4, so that the time required for reprogramming increases.

Furthermore, when the boot loader 10R is rewritten by a method not using the debug port, for example, there is a case where writing after erasing of the boot loader 10R fails due to a cause such as loss of connection between the diagnosis tool 7 and the electronic control device 1 in the middle of rewriting. In this case, there is a risk that there is no method for returning the electronic control device 1. When falling into this state, there is no method for returning the electronic control device 1 other than the method using the debug port. In order to avoid such a risk, it is desirable not to rewrite the boot loader.

According to the present embodiment, even when the memory map of the division units 11 to 1N of the control software SFT in the code flash 61 of the flash ROM 6 is different before and after reprogramming, it is possible to write the control software SFT in the electronic control device 1 without using a special reprogramming means such as use of reprogramming software deployed via the debug port or in the RAM.

First Embodiment

The first embodiment is a configuration example in which the address header 20 illustrated in FIG. 2 is stored in the code flash 61. Hereinafter, the first embodiment will be described with reference to FIGS. 5 to 11.

Figure 5:
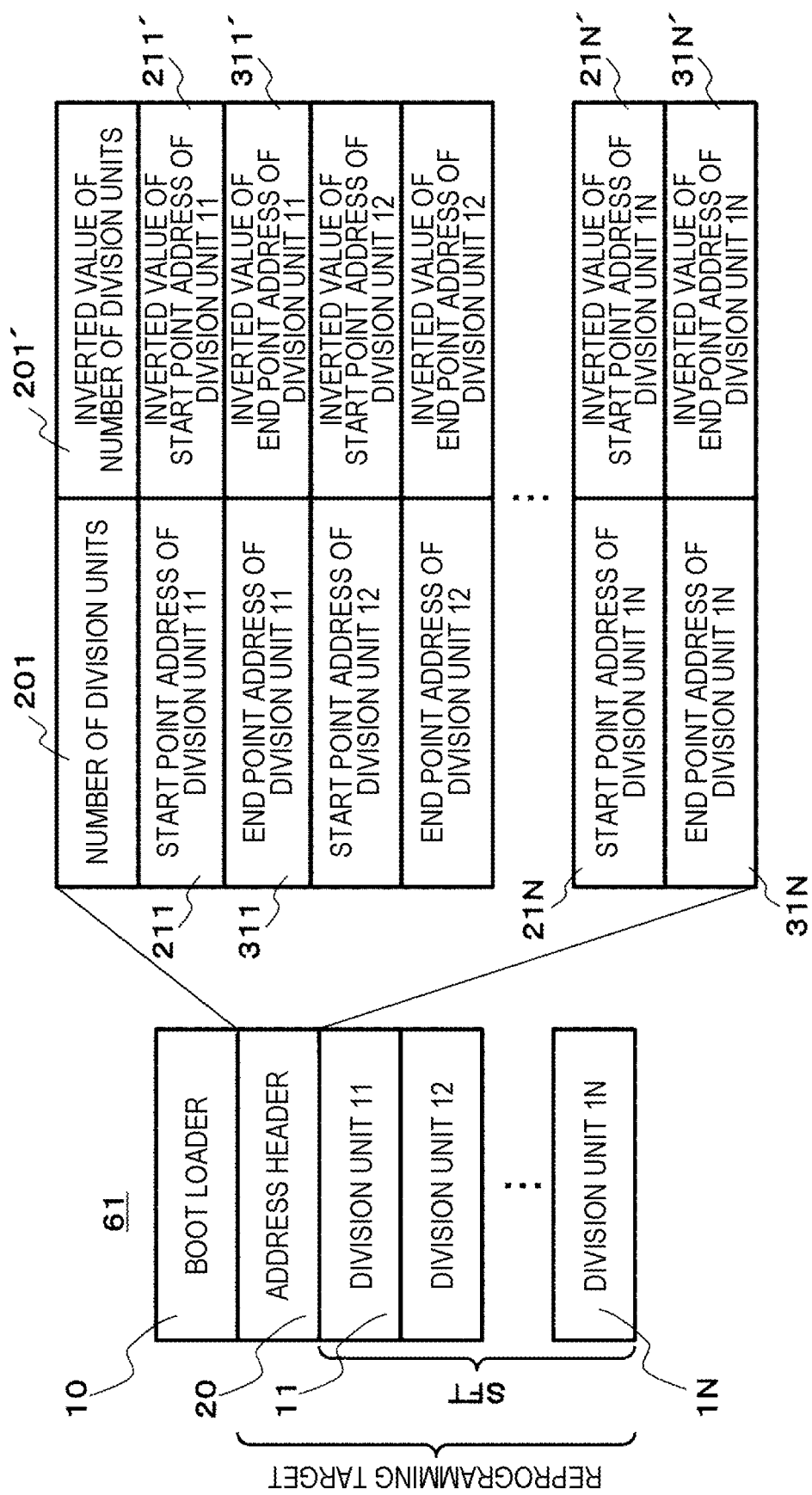
FIG. 5 is a diagram illustrating a first configuration example of an address header.

FIG. 5 is a diagram illustrating a first configuration example of the address header. As illustrated in FIG. 5, the validity confirmation information stored in the address header 20 includes the number 201 of division units of the control software SFT, and start point addresses 211 to 21N and end point addresses 311 to 31N of the division units 11 to 1N. The validity confirmation information further includes an inverted value 201' of the number 201 of division units, inverted values 211' to 21N' of the start point addresses 211 to 21N, and inverted values 311' to 31N' of the end point addresses 311 to 31N. Each of the inverted values 201', 211' to 21N', and 311' to 31N' is a value for verifying the validity of the data itself of each of the number of division units 201, the start point addresses 211 to 21N, and the end point addresses 311 to 31N. That is, the address header 20 holds the inverted value (201', 211' to 21N', 311' to 31N') for verifying the validity of the validity confirmation information itself (division information itself) of the address header 20 as a part of the validity confirmation information (division information).

Note that the address header 20 illustrated in FIG. 5 does not include information regarding storage address information or size information of a validation value (expected value EV) for each of the division units 11 to 1N. That is, in this example, as described with reference to FIG. 2, since it is determined as a rule that the validation value (expected value EV) for the division units 11 to 1N is stored in the area (alternatively, an area in the vicinity of the end point address of the storage area of each division unit) near the start point address of the storage area of each of the division units 11 to 1N, the address header 20 may not include the information regarding the storage address information and the size information of the validation value (expected value EV).

Figure 6:
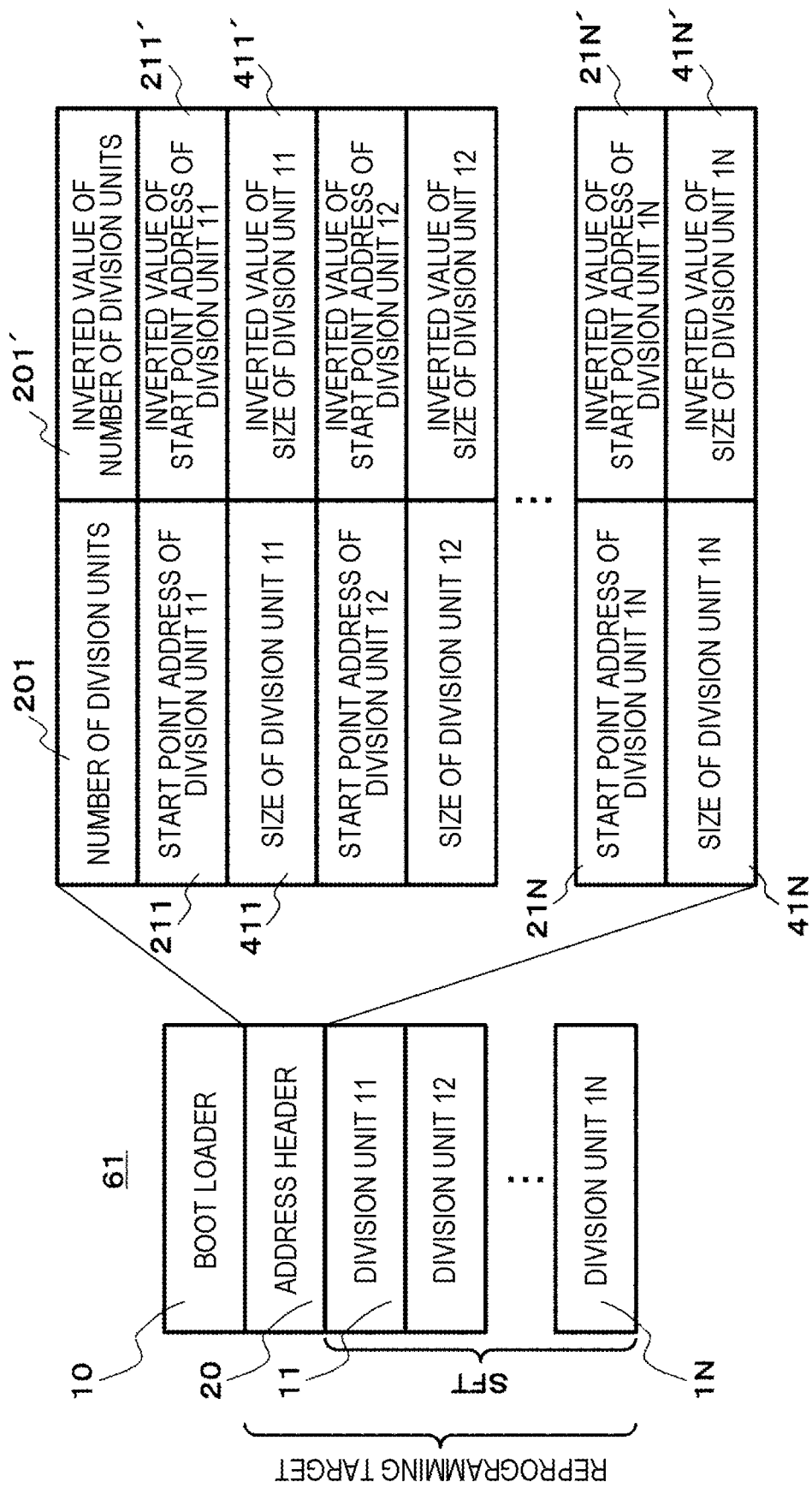
FIG. 6 is a diagram illustrating a second configuration example of an address header.

FIG. 6 is a diagram illustrating a second configuration example of the address header. In FIG. 5, any one of the start point addresses 211 to 21N and the end point addresses 311 to 31N may be replaced with size information. As an example, FIG. 6 illustrates a configuration example in which the end point address is replaced with size information. The address header 20 illustrated in FIG. 6 is different from that in FIG. 5 in that sizes 411 to 41N of the division units 11 to 1N and inverted values 411' to 41N' of the sizes of the division units 11 to 1N are provided in FIG. 6. That is, in FIG. 6, instead of the end point addresses 311 to 31N of the division units 11 to 1N in FIG. 5, the sizes 411 to 41N of the division units 11 to 1N are stored in the validity confirmation information of the address header 20. Since the other configuration of FIG. 6 is the same as the other configuration of FIG. 5, the redundant description will be omitted. Note that, although FIG. 6 illustrates a configuration example in which the end point addresses 311 to 31N in FIG. 5 are replaced with the size information (411 to 41N), the start point addresses 211 to 21N may be replaced with the size information (411 to 41N) without changing the end point addresses 311 to 31N in FIG. 5.

Figure 7:
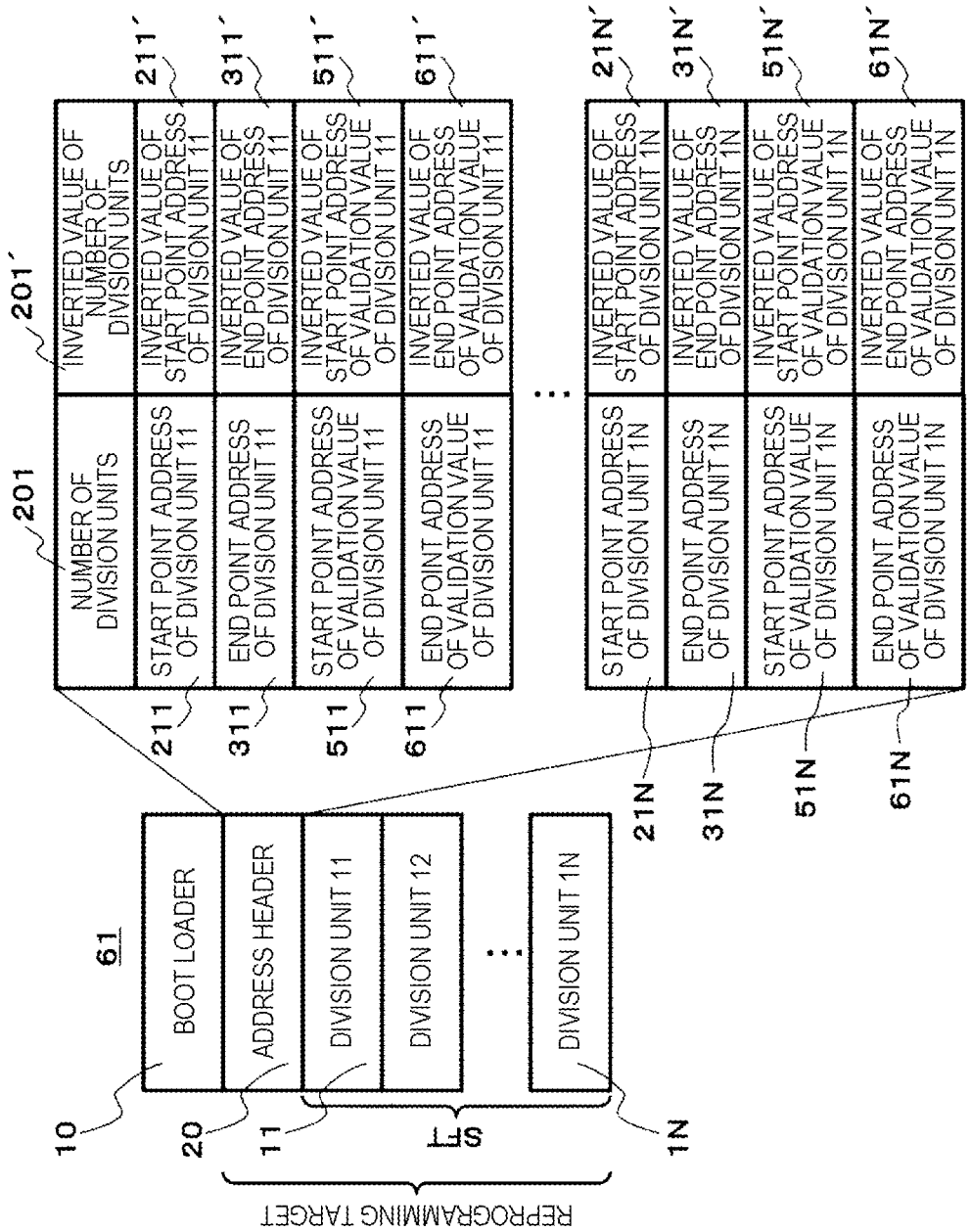
FIG. 7 is a diagram illustrating a third configuration example of an address header.

FIG. 7 is a diagram illustrating a third configuration example of the address header. The address header 20 illustrated in FIG. 7 is different from that in FIG. 5 in that start point addresses 511 to 51N and end point addresses 611 to 61N of storage areas of validation values (expected values EV) of the division units 11 to 1N are added to the address header 20 in FIG. 7. In addition, inverted values 511' to 51N' of the start point addresses 511 to 51N and inverted values 611' to 61N' of the end point addresses 611 to 61N are added to the address header 20. Since the other configuration of FIG. 7 is the same as the other configuration of FIG. 5, the redundant description is omitted.

Figure 8:
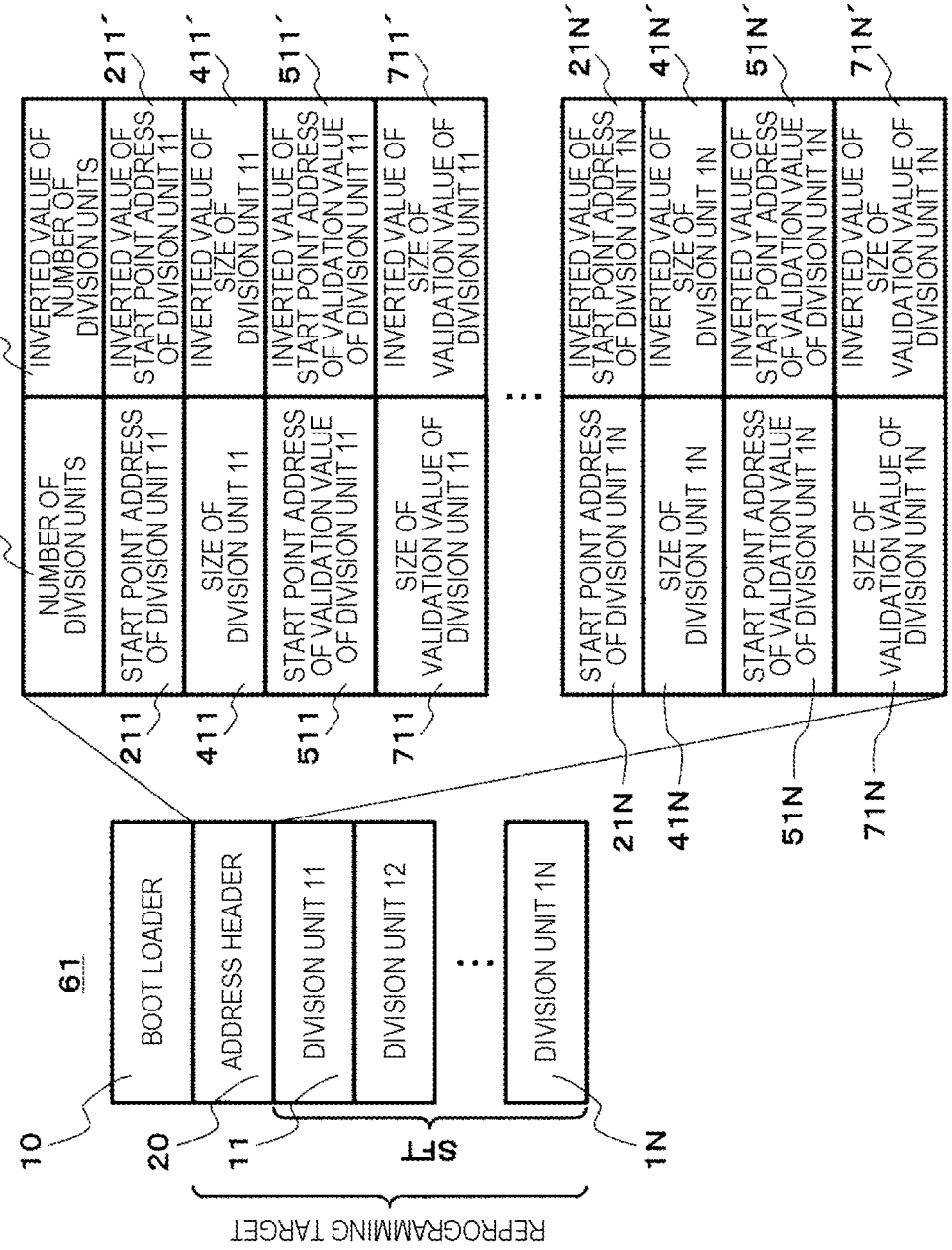
FIG. 8 is a diagram illustrating a fourth configuration example of the address header.

FIG. 8 is a diagram illustrating a fourth configuration example of the address header. The address header 20 illustrated in FIG. 8 is different from that in FIG. 7 in that the sizes 411 to 41N of the division units 11 to 1N and the inverted values 411' to 41N' of the sizes of the division units 11 to 1N are provided in FIG. 8, and the sizes 711 to 71N of the validation values (expected values EV) of the division units 11 to 1N and the inverted values 711' to 71N' of the sizes of the validation values (expected values EV) of the division units 11 to 1N are provided. Since the other configuration of FIG. 8 is the same as the other configuration of FIG. 7, the redundant description is omitted.

Figure 9:
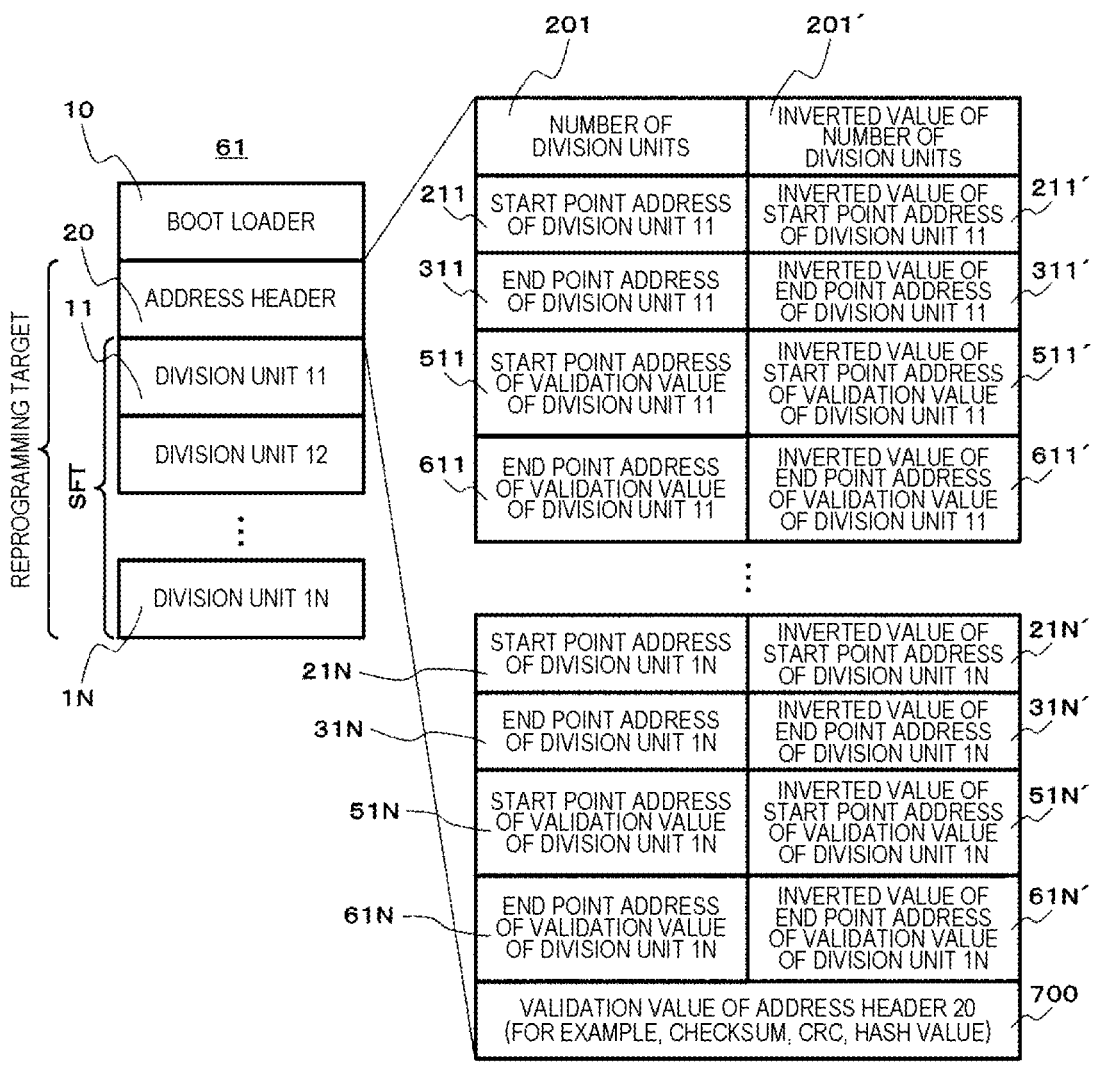
FIG. 9 is a diagram illustrating a fifth configuration example of the address header.

FIG. 9 is a diagram illustrating a fifth configuration example of the address header. The address header 20 illustrated in FIG. 9 is different from that in FIG. 7 in that a validation value 700 of the address header 20 is provided in the address header 20 in FIG. 9. As a result, it is possible to confirm the validity of the address header 20. The validation value 700 can be, for example, a checksum, CRC, or a hash value of the address header 20. As a result, falsification of the address header 20 can be detected by confirming validity of the address header 20 before reading the information in the address header 20 or as processing at the time of activation of the electronic control device 1. As a result, it is possible to avoid execution of malicious control software due to falsification of the address header 20. Since the other configuration of FIG. 9 is the same as the other configuration of FIG. 7, the redundant description is omitted. Note that the validation value 700 of the address header 20 may be provided in the address header 20 of FIGS. 5 to 8.

Operation at Activation of Electronic Control Device

Figure 10:
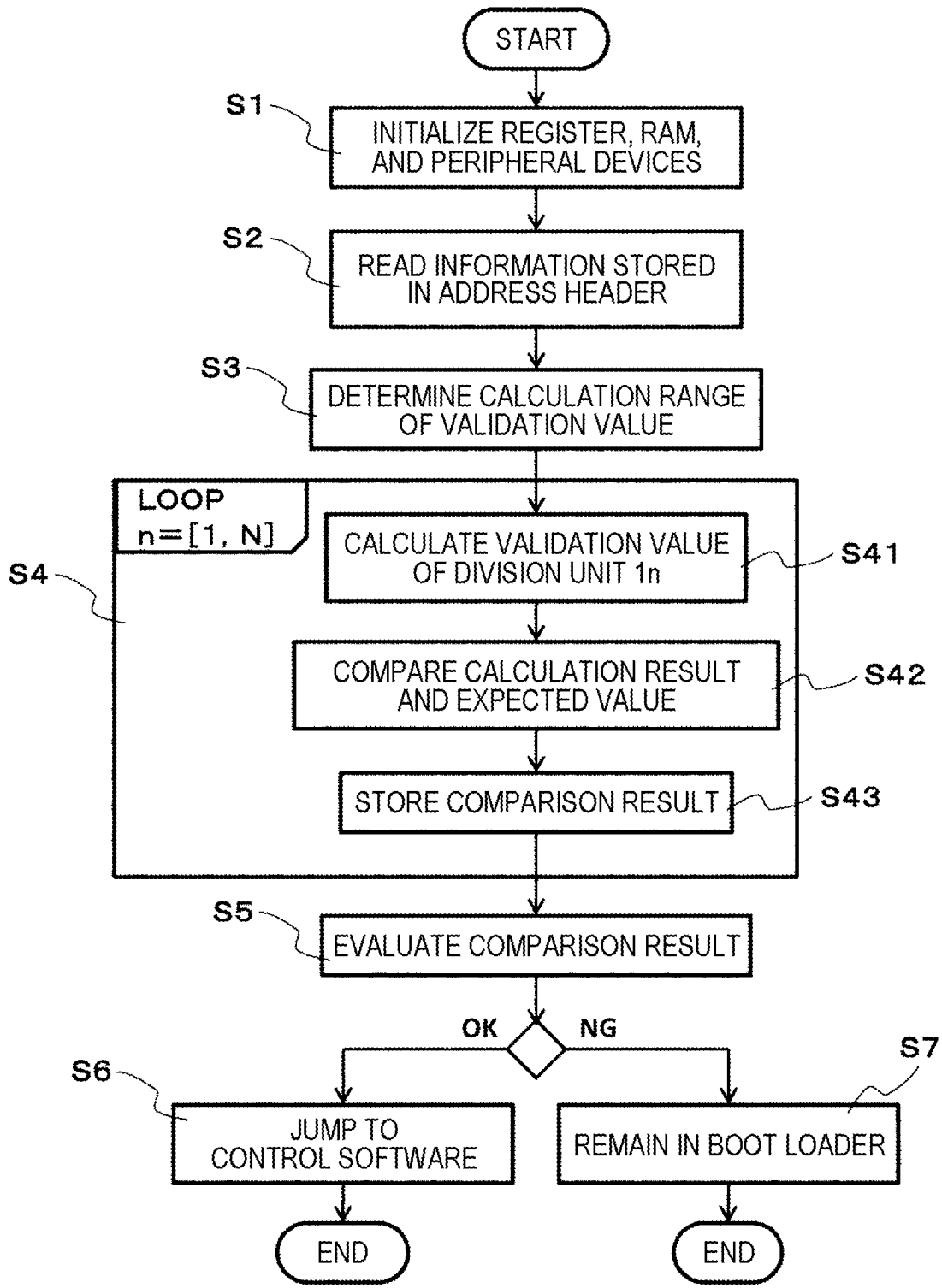
FIG. 10 is a flowchart for explaining an operation at the time of activation of the electronic control device.

FIG. 10 is a flowchart illustrating an operation at the time of activation of the electronic control device. When the electronic control device 1 is activated, the CPU 3 of the microcomputer 2 first executes the boot loader 10. Hereinafter, the operation at the time of activation of the electronic control device 1 will be described for each step.

Step S1

In the execution of the boot loader 10, an internal register, RAM, peripheral devices, and the like of the microcomputer 2 are first initialized. Thereafter, the validity of the control software SFT written in the flash ROM 6 is verified (steps S2 to S5).

Step S2

The CPU 3 reads validity confirmation information (division information) stored in the address header 20.

Step S3

Next, the CPU 3 determines the calculation range of the validation value based on the number 201 of division units of the address header 20, the start point addresses 211 to 21N of the division units 11 to 1N, the end point addresses 311 to 31N of the division unit 11 to 1N, or the sizes 411 to 41N of the division units 11 to 1N.

Step S4

Next, the CPU 3 determines the number n of loops (LOOP) for calculating a validation value based on the number of division units 201 of the address header 20. In this example, the number n of loops is 1 to N. Then, the CPU 3 calculates the validation value of the division unit 1$n$ (step S41), compares the calculation result of the validation value with the expected value EV (step S42), and stores the comparison result in, for example, the RAM 4 or a built-in register (step S43).

Step S5

Next, the CPU 3 evaluates the comparison result. In the evaluation of the comparison result, when it is determined that the control software SFT is valid (OK), the process proceeds to step S6. In the evaluation of the comparison result, when it is determined that the control software SFT is not valid (NG), the process proceeds to step S7.

Step S6

The CPU 3 completes the execution of the boot loader 10 and jumps to the control software SFT. As a result, the CPU 3 proceeds to the execution of the control software SFT.

Step S7

The CPU 3 does not jump to the control software SFT and remains in the boot loader 10. In this case, if there is additionally necessary initialization processing, the initialization processing is executed, and a state is brought about where rewriting (reprogramming) of the control software SFT is waited.

In step S4, as a method of verifying the validity of the control software SFT, there is a method of using one or two or more of a checksum, a cyclic redundancy check (CRC), a hash value, and a digital signature. For example, in the method using the checksum, the validity of the control software SFT is verified by calculating the checksum for the target address range and comparing the checksum with the expected value EV that is the correct value embedded in advance in the flash ROM 6 or a known correct value. The value for verifying the validity as described above is referred to as a validation value in the present specification.

In the case of the digital signature, the digital signature held in the flash ROM 6 is decrypted with a public key held in advance in the flash ROM 6 or a public key obtained by communication with the outside, and a hash value is extracted. Thereafter, the electronic control device 1 compares the extracted hash value with the value calculated for the target address range to verify the validity.

When the control software SFT is logically divided, this validity verification is performed for each of the division units 11 to 1N. Then, when validity of even one of the division units 11 to 1N cannot be confirmed, the jump to the control software SFT is not performed.

As described above, in order to verify the validity, the division information for each of the division units 11 to 1N of the control software SFT and, in some cases, the information of the location in which the correct value (expected value EV) of the validity confirmation value is embedded are required. As illustrated in the comparative example of FIG. 4, when these pieces of information are held inside the boot loader 10 and the boot loader 10 has a reprogramming function, the boot loader 10 is not rewritten at the time of reprogramming. Therefore, when the mode of division of the control software SFT is different before and after reprogramming, the boot loader 10 cannot correctly confirm the validity of the control software SFT.

In the first embodiment, an information group necessary for validity verification as described above is arranged in an area that can be externally rewritten and can be fixed or tracked. Then, at the time of validity verification, the above-described problem is solved by referring to the area. In the present specification, an information group necessary for validity verification is referred to as an address header 20. A location where the address header 20 is arranged may be, for example, a fixed area or an arbitrary area in the code flash 61 of the flash ROM 6 that stores the control software SFT, or may be a fixed area or an arbitrary area in the data flash 62 (see the second embodiment) of the flash ROM 6 that stores data, or a fixed area or an arbitrary area in the EEPROM.

The address header 20 may be arranged in an arbitrary area in the data flash 62 or the EEPROM, that is, in a storage area of a free address. In this case, it is preferable to secure the trackability using software that deploys the stored content of the address header 20 in the RAM 4 as needed.

Confirmation of Validity of Control Software

Figure 11:
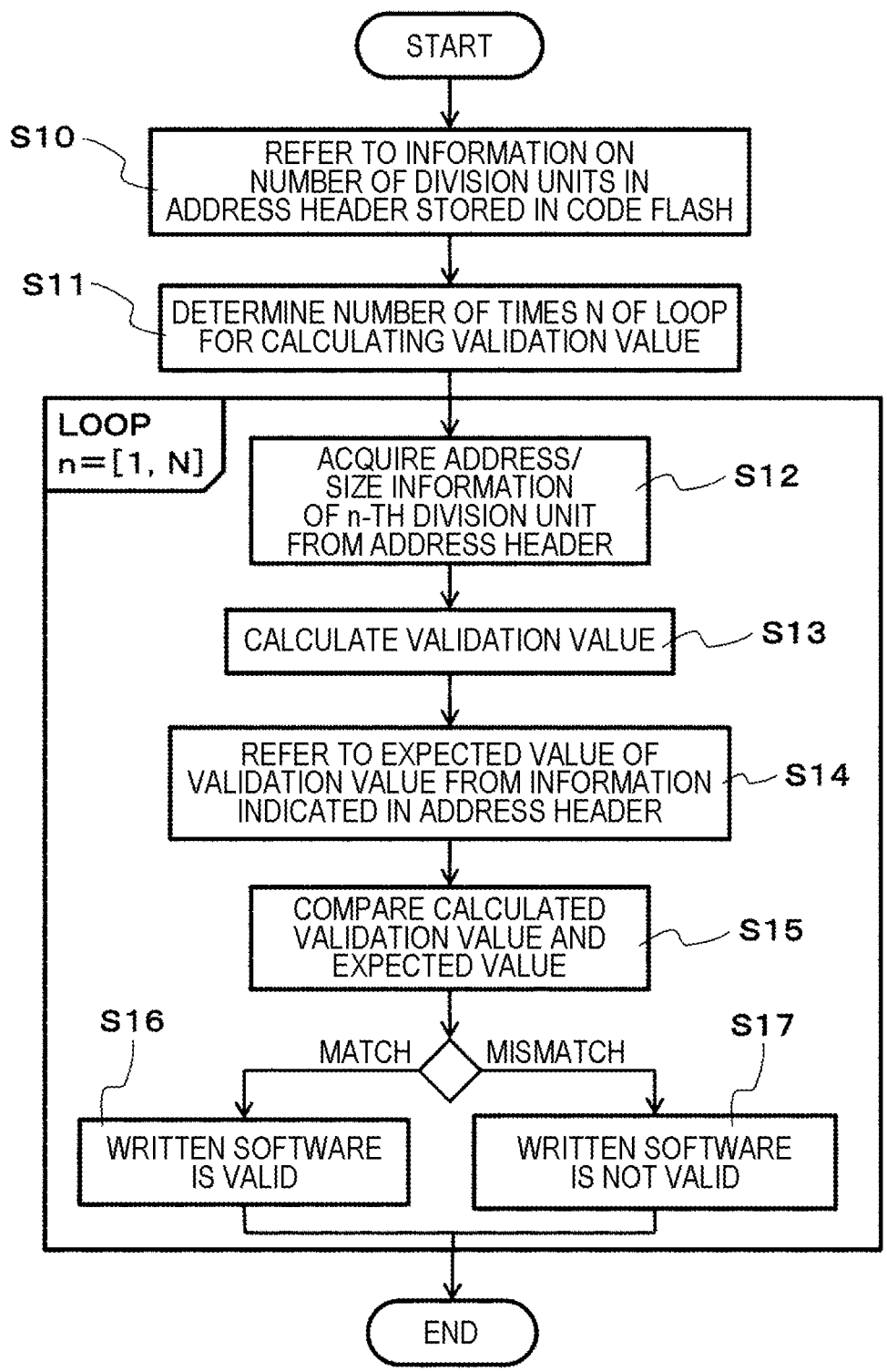
FIG. 11 is a flowchart when validity of control software is confirmed using an address header.

FIG. 11 is a flowchart when the validity of the control software is confirmed using the address header. Hereinafter, the operation of confirming the validity of the control software will be described for each step.

Step S10

First, the information 201 on the number of division units in the address header 20 stored in the code flash 61 is referred to.

Step S11

Next, the number N of loops (LOOP) for calculating the validation value is determined. In this example, the number n of loops is 1 to N.

Step S12

Thereafter, for each of the division units 11 to 1N, the start point addresses 211 to 21N, the end point addresses 311 to 31N, or the size information 411 to 41N are acquired with reference to the address header 20, and the calculation range of the validation value is determined based on the acquired information.

Step S13

Then, a validation value is calculated.

Step S14

The expected value EV of the validation value embedded in the areas (for example, 511 to 51N and 611 to 61N in FIG. 7, and 511 to 51N and 711 to 71N in FIG. 8) designated by the address header 20 stored in the code flash 61 is referred to.

Step S15

The calculated validation value and the expected value EV are compared, and the process proceeds to step S16 when the two values match each other, and the process proceeds to step S17 when the two values do not match each other.

Step S16

It is determined that the control software SFT written in the code flash 61 is valid.

Step S17

It is determined that the control software SFT written in the code flash 61 is not valid.

Note that, when the location where the expected value EV of the validation value is stored can be determined from the relative value of the start point addresses 211 to 21N or the end point addresses 311 to 31N stored in the address header 20 (see FIGS. 5 and 6), the information regarding the storage location of the expected value EV does not need to be included in the address header 20.

Note that, in the case of the configuration in which the validation value 700 of the address header 20 itself illustrated in FIG. 9 is added, it is preferable to confirm the validity of the address header 20 using the validation value 700 before reading the information in the address header 20 illustrated in FIGS. 10 and 11 or as processing at the time of activation of the ECU 1. As a result, falsification of the address header 20 can be detected, and thus execution of malicious software due to falsification of the address header 20 can be avoided.

The validation value related to the control software SFT is verified not only at the time of activation of the ECU 1 but also immediately after reprogramming. This is an operation for verifying whether intended control software has been correctly written, and may be triggered by a request from a tool (diagnosis device) for performing reprogramming, or may be performed as post-processing of a data communication end request.

When the configuration of the division units, that is, the number of division units or the address arrangement does not change before and after reprogramming, it is not necessary to rewrite the address header 20. However, when the configuration of the division units changes, it is necessary to rewrite the address header 20 according to the configuration. Since the validation value verification processing is dynamically performed according to the content of the address header 20 as illustrated in FIG. 11, if the address header 20 is appropriately rewritten, the validation value related to the control software SFT can be verified without any problem even if the configuration of the division unit of the control software SFT is different before and after the reprogramming.

Second Embodiment

In the first embodiment, the configuration example in which the address header 20 is stored in a desired address area of the code flash 61 has been described. The second embodiment is a configuration example in which the address header 20 illustrated in FIG. 3 is stored in a desired address area of the data flash 62. Hereinafter, the second embodiment will be described with reference to FIGS. 12 to 16.

Figure 12:
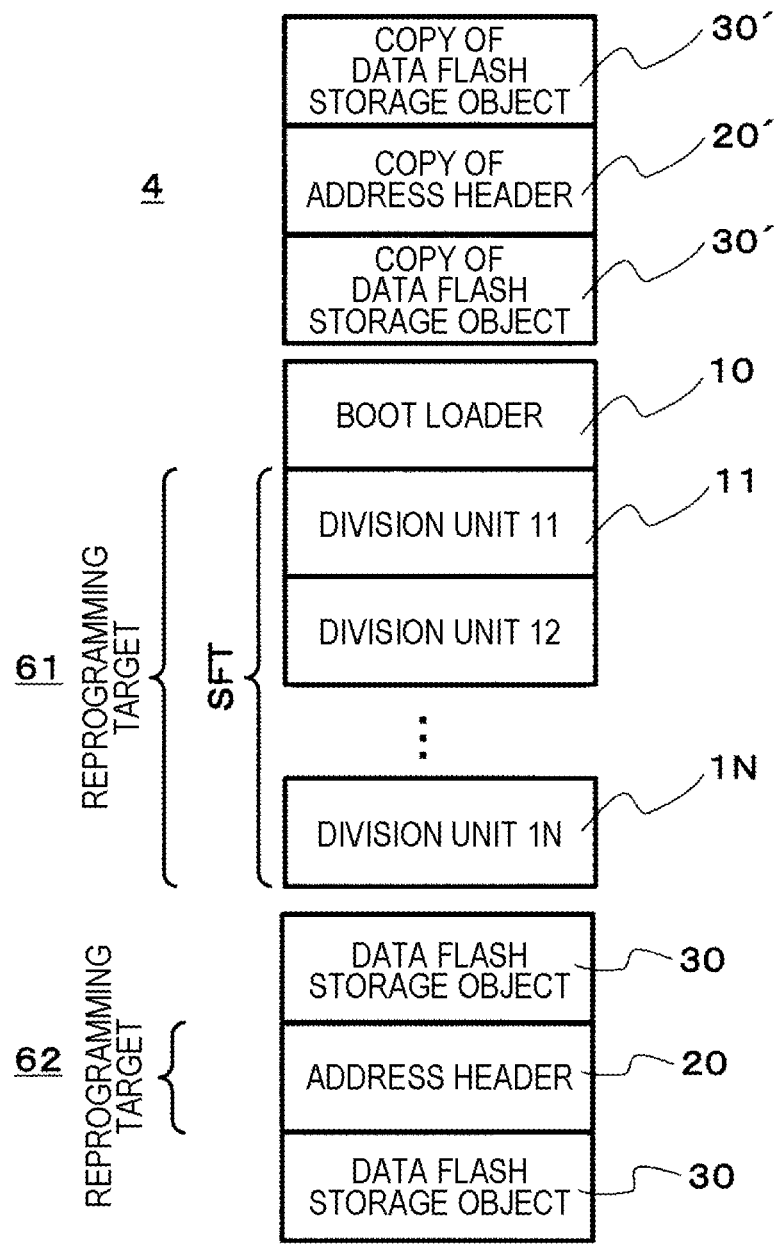
FIG. 12 is a configuration example when an address header is stored in a free address of a data flash.
Figure 14:
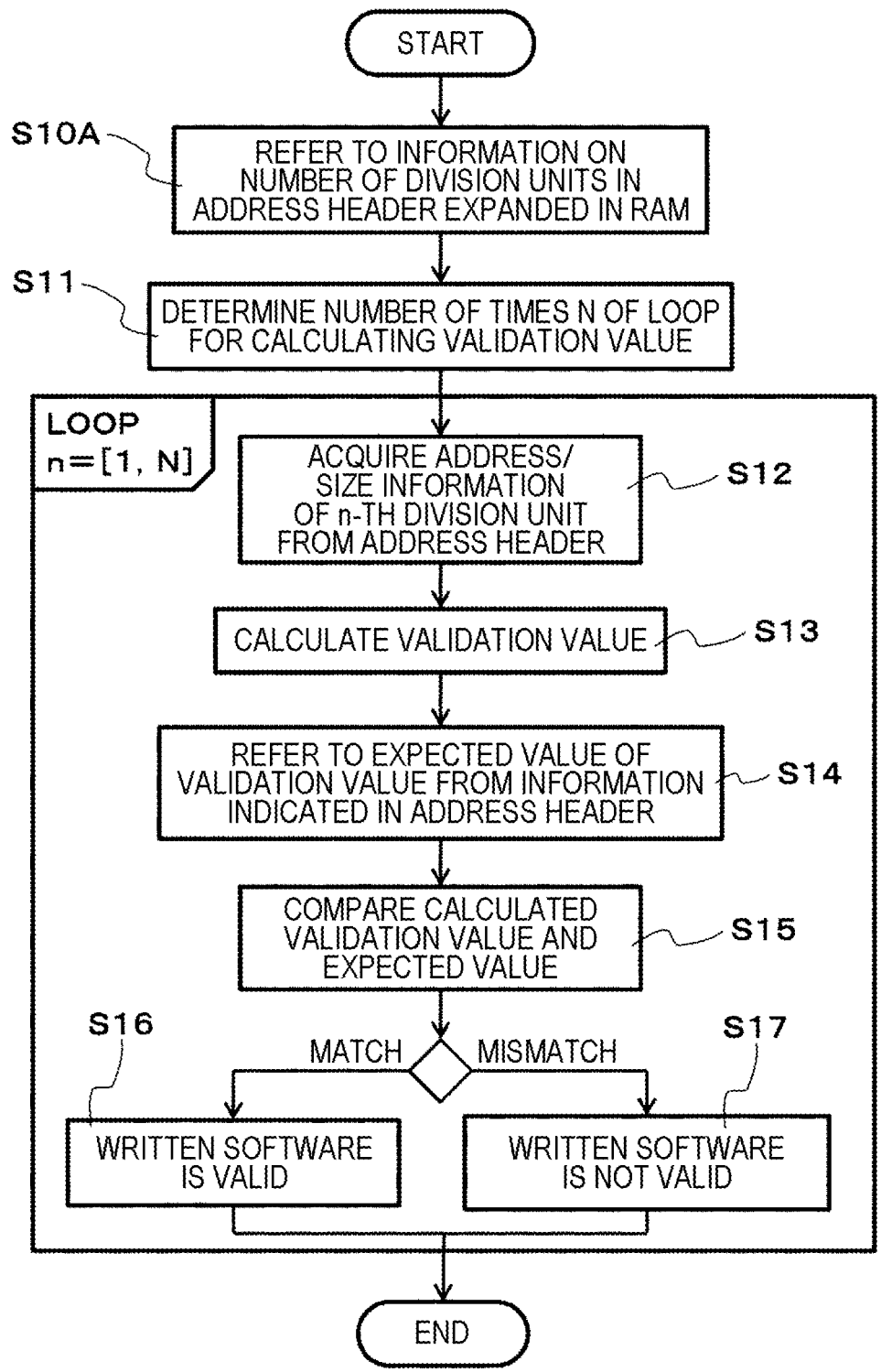
FIG. 14 is a flowchart when validity of control software is confirmed using an address header stored in a data flash.

FIG. 12 illustrates a configuration example when the address header is stored in the free address of the data flash. FIG. 13 is a diagram illustrating a configuration example of the address header 20 of FIG. 12. FIG. 14 is a flowchart when the validity of the control software is confirmed using the address header stored in the data flash.

FIG. 12 illustrates an address space of the RAM 4 and address spaces of the code flash 61 and the data flash 62 of the flash ROM 6.

The code flash 61 stores a boot loader 10 and division units 11 to 1N of the control software SFT. The address header 20 and the data flash storage object 30 are stored in the data flash 62. In the RAM 4, a copy 20' of the address header 20 and a copy 30' of the data flash storage object 30 are stored by deployment software that deploys the contents (20, 30) of the data flash 62 in the RAM 4 as needed.

As illustrated in FIG. 13, the address header 20 and the copy 20' of the address header 20 hold the number 201 of division units of the control software SFT, the start point addresses 211 to 21N and the end point addresses 311 to 31N of the division units 11 to 1N, and the start point addresses 511 to 51N and the end point addresses 611 to 61N of the areas in which the validation values of the division units 11 to 1N are embedded. Similarly to the relationship between FIGS. 6 and 8, either the start point address or the end point address may be replaced with size information (sizes 411 to 41N of the division units 11 to 1N and sizes 711 to 71N of validation values of the division units 11 to 1N).

When the value of the address header 20 is referred to, the value of the copy 20' of the address header 20 on the RAM 4 is referred to. When the address header 20 is arranged not in the free address of the data flash 62 but in the fixed area of the data flash 62, a value on the RAM 4 may be referred to using similar deployment software, or the address header 20 of the data flash 62 may be directly referred to.

FIG. 14 is a flowchart when the validity of the control software is confirmed using the address header stored in the data flash. The flowchart of FIG. 14 is different from the flowchart of FIG. 11 in that the address header 20 (strictly speaking, a copy 20' of the address header 20) deployed in the RAM 4 is referred to in FIG. 14 as illustrated in step S10A. In this case, the address header described in steps S12 and S14 also corresponds to the copy 20' of the address header 20. Since the other steps in FIG. 14 are the same as the other steps in FIG. 11, the redundant description will be omitted, but the steps will be briefly described below.

First, the address header 20 stored in the data flash 62 is deployed in the RAM 4. The information 201 on the number of division units in the address header 20 is referred to via the copy 20' of the address header 20 deployed in the RAM 4 (step S10A), and the number N of loops for calculating the validation value is determined (step S11). Thereafter, for each division unit, the address or the address/size information is referred to (step S12), the calculation range of the validation value is determined based on the address or the address/size information, and the validation value is calculated (step S13).

The calculated validation value is compared with the expected value EV embedded in the area designated by the address header 20 (strictly speaking, the copy 20' of the address header 20) stored in the data flash 62 (steps S14 and S15), and it is determined that the written control software SFT is valid (step S16) when the two values match each other. Note that, when the location where the expected value EV of the validation value is stored can be determined from the relative value of the address (start point addresses 211 to 21N and end point addresses 311 to 31N) stored in the address header 20, the information (511 to 51N and 611 to 61N) does not need to be included in the address header 20.

FIG. 15 is a diagram illustrating another configuration example of the address header 20 of FIG. 12. The address header 20 illustrated in FIG. 15 is different from the address header 20 illustrated in FIG. 13 in that a validation value 700 of the address header 20 itself is added in FIG. 15. Since the other configuration of FIG. 15 is the same as the other configuration of FIG. 13, the redundant description is omitted.

It is preferable to confirm validity of the address header 20 using the validation value 700 of the address header 20 itself in FIG. 15 before reading the information in the address header 20, or as a part of processing at the time of activation of the ECU 1, or processing of deploying the information in the RAM 4. As a result, falsification of the address header 20 can be detected, and thus execution of malicious control software due to falsification of the address header 20 can be avoided.

The validation value related to the control software SFT is verified not only at the time of activation of the ECU 1 but also immediately after reprogramming. This is an operation for verifying whether intended control software SFT has been correctly written, and may be triggered by a request from a tool (diagnosis device) for performing reprogramming, or may be performed as post-processing of a data communication end request.

When the configuration of the division units 11 to 1N, that is, the number of division units 11 to 1N or the address arrangement does not change before and after reprogramming, it is not necessary to rewrite the address header 20. However, when the configuration of the division units 11 to 1N changes, it is necessary to rewrite the address header 20 according to the configuration. Since the validation value verification processing is dynamically performed according to the content of the address header 20 as illustrated in FIG. 14, if the address header 20 is appropriately rewritten, the validation value can be verified without any problem even if the configuration of the division units 11 to 1N is different before and after the reprogramming.

A method of rewriting the address header 20 will be described below.

In the first embodiment, there is a method of rewriting similarly to the reprogramming of the control software SFT. In this case, the address header 20 can be treated as software. The address header 20 may be treated as a division unit of one piece of software, or may be treated as being included in the division unit.

In the second embodiment, since the address header 20 is treated as data instead of software, the address header 20 is not updated in the reprogramming procedure. Therefore, when the address header 20 is updated, the address header 20 is updated using a data writing service. In this case, a data identifier is given to the address header 20, data to be updated is designated as the address header 20 by using the identifier, and the data is transmitted following the identifier, thereby updating the address header 20. Alternatively, when the address header 20 is arranged in the fixed area, there is also a method of designating data to be updated by directly designating an address. The method using the data identifier and the method directly designating the address can be applied to the second embodiment when the address header 20 is treated as data.

Figure 16:
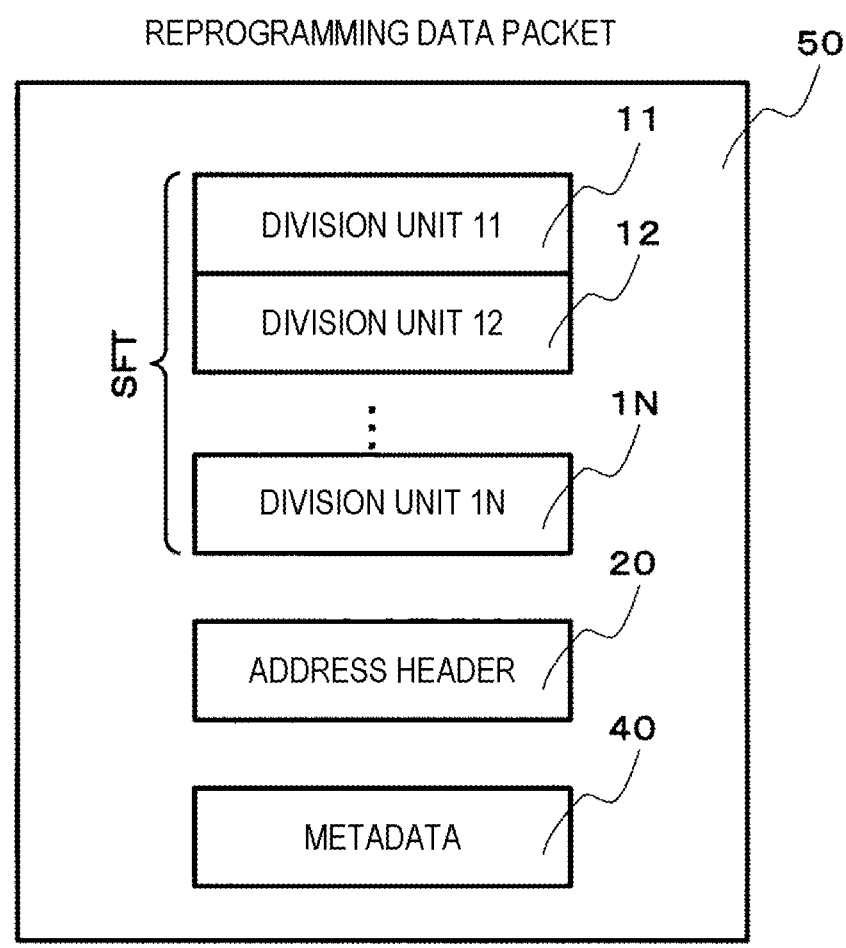
FIG. 16 is a diagram illustrating a reprogramming data package including software, an address header, and metadata.

FIG. 16 is a diagram illustrating a reprogramming data package including control software, an address header, and metadata. When the address header 20 is treated as data, it is preferable to manage the address header as a set with the control software SFT. For example, as illustrated in FIG. 16, when a set of the ROM file of the control software, the ROM file of the address header 20, and the metadata 40 is managed as one piece of reprogramming data 50, it is possible to avoid a situation in which validity verification of the control software SFT cannot be correctly performed due to mismatch between the memory map of the control software SFT and the address header 20.

The metadata 40 can include, for example, the number and the address/size information of division units of the control software SFT, the address/size information and the data identifier of the address header 20, option information for specifying an information transfer method used at the time of reprogramming or data writing, information indicating a data format of the ROM file, and the like. However, since the ROM file itself can hold the number of division units of the control software SFT and the address/size information of the address header 20, in that case, the information may not be described in the metadata 40.

Furthermore, when the address header 20 is treated as data and when the jump destination in a case where the control software SFT is determined to be valid is determined based on the content of the address header 20, it is possible to control the division unit executed at the time of activation of the ECU 1 among the division units 11 to 1N of the control software SFT stored in the code flash 61 by rewriting only the address header 20. By using this, for example, it is possible to switch between the normal control mode and the factory inspection mode.

For example, it is assumed that the division units 11, 12, 13, and 14 exist on the code flash 61, and each of a set of the division units 11 and 12 and a set of the division units 13 and 14 is configured to be established as one piece of control software SFT. Then, a case where the boot loader 10 determines that the control software SFT is valid by validity verification and then jumps to the start point address of the first discovered division unit among the information of the division units 11 to 14 included in the address header 20 is assumed.

Under the above two assumptions, it is assumed that the address header 20 includes the address/size information of the division units 11 and 12 and information indicating that the number of division units is two. When the ECU 1 is activated in this state, the validity of the control software SFT is verified according to the flow of FIG. 11 or 14. When it is determined that the written control software SFT is valid and the start point address of the division unit first discovered by the boot loader 10 is that of the division unit 11, a jump from the boot loader 10 to the division unit 11 occurs.

If the control software SFT including the division units 11 and 12 is independent from the control software SFT including the division units 13 and 14, the division units 13 and 14 are not executed, and only the control software SFT including the division units 11 and 12 is executed.

Here, it is assumed that the address header 20 is rewritten by the data writing service, and the information included in the address header 20 is changed to the address/size information of the division units 13 and 14 and the information indicating that the number of division units is 2. When the ECU 1 is reactivated in this state, the boot loader 10 starts validity verification of the division units 13 and 14. Assuming that each of the division units 13 and 14 is determined to be valid by validity verification and the start point address of the division unit first discovered by the boot loader 10 is that of the division unit 13, a jump from the boot loader 10 to the division unit 13 occurs. As described above, if the control software SFT including the division units 13 and 14 is independent from the control software SFT including the division units 11 and 12, the division units 11 and 12 are not executed, and only the control software SFT including the division units 13 and 14 is executed.

As described above, when the address header 20 is treated as data and when the jump destination in a case where the control software SFT is determined to be valid is determined based on the content of the address header 20, it is possible to control the division unit executed at the time of activation among the division units of the control software SFT stored in the code flash 61 by rewriting only the address header 20. By using this, for example, it is possible to switch between the normal control mode and the factory inspection mode.

Although the invention devised by the present inventors has been specifically described above based on the embodiments and examples, the present invention is not limited to the above embodiments and examples, and it goes without saying that various modifications can be made.

REFERENCE SIGNS LIST

1 ECU
2 microcomputer
3 CPU

4 RAM
5 communication module
6 flash ROM
10 boot loader
11 to 1N division unit of control software
20 address header
20' address header deployed on RAM
30 data flash storage object
30' data flash storage object deployed on RAM
40 metadata
50 reprogramming data package
201 number of division units
201' inverted value of number of division units
211 to 21N start point address of division unit 1N
211' to 21N' inverted value of start point address of division unit 1N
311 to 31N end point address of division unit 1N
311' to 31N' inverted value of end point address of division unit 1N
411 to 41N size of division unit 1N
411' to 41N' inverted value of size of division unit 1N
511 to 51N start point address of validation value of division unit 1N
511' to 51N' inverted value of start point address of validation value of division unit 1N
611 to 61N end point address of validation value of division unit 1N
611' to 61N' inverted value of end point address of validation value of division unit 1N
700 validation value of address header

The invention claimed is:

1. An electronic control device comprising:
a microcomputer including a CPU and a nonvolatile memory, the nonvolatile memory comprising:
activation software;
control software;
and validity confirmation information for confirming validity of the control software, wherein:
a storage area of the validity confirmation information in the nonvolatile memory is different from a storage area of the activation software, the activation software verifies the validity of the control software based on the validity confirmation information, and the CPU jumps to the control software after the validity of the control software is confirmed;
a communication unit for communicating with the outside, the activation software has a reprogramming function of the control software, and the reprogramming function includes:
erasing the control software and the validity confirmation information from the nonvolatile memory;
writing new control software and new validity confirmation information from the communication unit into the nonvolatile memory;
and verifying the validity of the control software written in the nonvolatile memory based on the validity confirmation information written in the nonvolatile memory.

2. The electronic control device according to claim 1, wherein the nonvolatile memory includes:
a first storage area in which software is mainly stored;
and a second storage area in which data is mainly stored, the activation software and the control software are stored in the first storage area, and the validity confirmation information is stored in the first storage area or the second storage area.

3. The electronic control device according to claim 2, wherein
the microcomputer further includes a volatile memory, and
when the validity confirmation information is stored in the second storage area,
the validity confirmation information stored in the second storage area is deployed in the volatile memory, and
verification of the validity of the control software based on the validity confirmation information written in the nonvolatile memory is performed by referring to the validity confirmation information deployed in the volatile memory.

4. The electronic control device according to claim 2, wherein
the nonvolatile memory includes erase blocks and a plurality of write blocks provided corresponding to the erase blocks,
data can be erased in units of the erase blocks, and
data can be written in units of the write blocks.

5. The electronic control device according to claim 2, wherein
the control software is divided into a plurality of division units and stored in the first storage area,
each of the plurality of division units includes an expected value,
the validity confirmation information includes:
a number of division units of the plurality of division units;
a start point address of each of the plurality of division units; and
an end point address or size information of each of the plurality of division units,
verification of the validity of the control software is performed for each of the plurality of division units, and is performed by calculating a validation value by calculating a sum value, a cyclic redundancy check (CRC) value, or a hash value based on the start point address, the end point address, or the size information corresponding to each of the plurality of division units and comparing the validation value with a corresponding expected value.

6. The electronic control device according to claim 5, wherein
the validity confirmation information further includes an inverted value of the number of division units, an inverted value of the start point address or an inverted value of the size information.

7. The electronic control device according to claim 6, wherein
the validity confirmation information further includes:
a start point address of a corresponding expected value of each of the plurality of division units; and
an end point address or size information of a corresponding expected value of each of the plurality of division units.

8. The electronic control device according to claim 7, wherein
the validity confirmation information further includes a validation value of the validity confirmation information.

9. A method for updating control software of an electronic control device, the electronic control device including a microcomputer including a CPU, a nonvolatile memory, and a communication unit for communicating with the outside, the nonvolatile memory including activation software, control software, and validity confirmation information for confirming validity of the control software, and a storage area of the validity confirmation information in the nonvolatile memory being different from a storage area of the activation software, the method comprising:
  enabling a reprogramming function of the control software of the activation software;
  erasing the control software and the validity confirmation information from the nonvolatile memory;
  writing new control software and new validity confirmation information from the communication unit into the nonvolatile memory;
  and verifying the validity of the control software written in the nonvolatile memory based on the validity confirmation information written in the nonvolatile memory, wherein:
    the validity of the control software is verified by the activation software based on the validity confirmation information, and the CPU jumps to the control software after the validity of the control software is confirmed;
  a communication unit for communicating with the outside, the activation software has a reprogramming function of the control software, and the reprogramming function includes:
  erasing the control software and the validity confirmation information from the nonvolatile memory;
  writing new control software and new validity confirmation information from the communication unit into the nonvolatile memory;
  and verifying the validity of the control software written in the nonvolatile memory based on the validity confirmation information written in the nonvolatile memory.

* * * * *